United States Patent Office 2,769,683
Patented Nov. 6, 1956

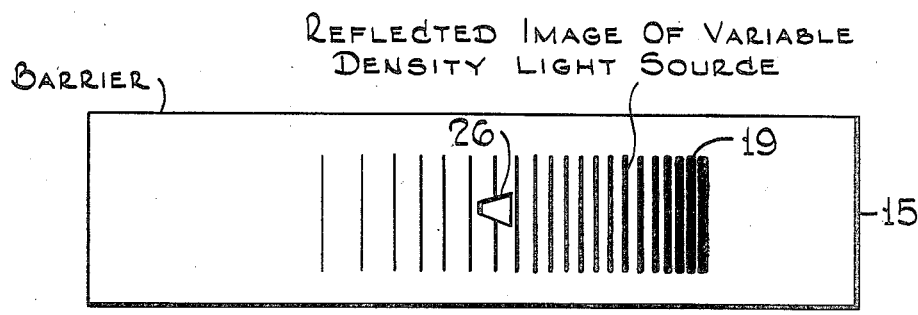
ZERO SIGNAL – MIRROR NOT ROTATED
VIEW-A
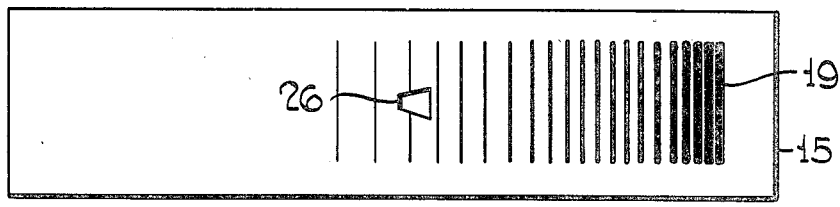
VALLEY POSITION – MIRROR ROTATED TO RIGHT
VIEW-B
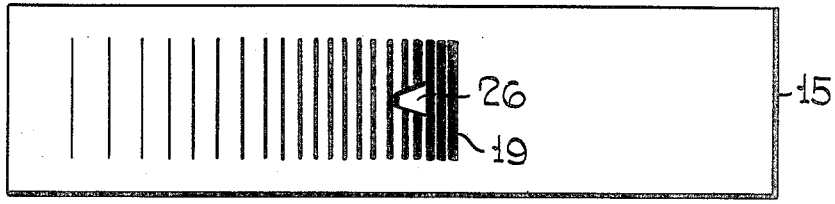
PEAK POSITION – MIRROR ROTATED TO LEFT
VIEW-C
FIG.-2

2,769,683

VARIABLE DENSITY RECORDING OF GALVANOMETER MOTION

Jesse D. Skelton, Tulsa, Okla., assignor to Esso Research and Engineering Company, a corporation of Delaware Application November 1, 1951, Serial No. 254,331

6 Claims. (Cl. 346—109)

The present invention is concerned with a novel method and apparatus for recording in the form of variable density photographic records electrical transients fed to a reflecting mirror type of galvanometer. The invention has particular application to the making of variable density seismograph records which are useful in geophysical exploration.

The general method of seismic exploration wherein a seismic disturbance is initiated at a selected point in the earth and reflected seismic waves are detected at a plurality of points spread out in a desired pattern has long been known. Briefly the method consists in picking up the detected waves with sensitive detectors, known as geophones, which translate the detected motion into electrical impulses. The latter are suitably amplified and recorded on a seismograph. The conventional seismograph record is obtained by means of a number of moving coil galvanometers each one of which has a mirror attached thereto, the mirrors being arranged in such relation to a source of light and a moving strip of sensitized paper or film that there will be recorded on the paper or film a plurality of wave forms or traces representative of the seismic waves that have been picked up by the individual geophones, amplified, and fed to the galvanometers. The strip of paper or film is moved longitudinally at a substantially constant speed and is provided by well known means with timing marks so that when the seismograph record or seismogram is later examined it is possible to determine the length of time required for the arrival of seismic waves at any particular point on the earth's surface, either directly from the source or by reflection from underlying strata. From other data obtained in the area being studied, such as seismic wave velocities in the various earth layers, it is then possible to estimate the depths of the various reflecting substrata.

Oscillograph records of detected seismic waves obtained as just described when made in favorable areas may often be examined visually to pick out prominent reflections which will show up as similar transients on the adjacent traces on the record. However, in many instances such reflections are difficult to distinguish because of the complexity of the wave forms. It has more recently been noted that if the detected impulses are recorded in the form of variable density photographic records many more reflections can often be noted. Suitable means for making such variable density records are described, for example, in U. S. Patent 2,051,153 of Frank Rieber.

When recording transients in the form of variable density photographic records, it is the usual practice to employ an incandescent lamp that varies in brightness in relation to the voltage fed to it. For best results the lamps must be carefully selected for their response characteristics. Furthermore, as disclosed in the aforementioned Rieber patent, the lamps must be small when they are used for seismic recording in view of the necessity for close spacing when recording a number of tracks or channels on a single film. There are a number of disadvantages associated with the use of such lamps. For example, since the lamps have a thermal lag the photographic record tends to be distorted somewhat and a complicated electric circuit is needed to overcome this, which not only requires extra equipment but also uses considerable power. Furthermore, when using the required electrical set-up to overcome lamp distortion a 100% modulation in the voltage fed to the equipment results in only 5% modulation in the light from the lamps. It is therefore necessary that the recording film have high contrast. This in turn leads to considerable photographic distortion which is a disadvantage particularly if the variable density record is to be played back for reproduction in another form.

It is an object of the present invention to provide a method and apparatus for recording transients in the form of variable density photographic records without requiring the use of a modulated light source. It is a further object of the invention to provide a method and means for recording transients directly as variable density records on photographic media while detecting the transients with a galvanometer.

The nature and objects of the invention will be more fully understood when reference is made to the accompanying drawings in which:

Figure 2 illustrates the effect of galvanometer position on the intensity of light reaching the recording medium; and, Figure 3 is a diagram of a channel shield arrangement permitting multiple channel recording.

Figure 1:
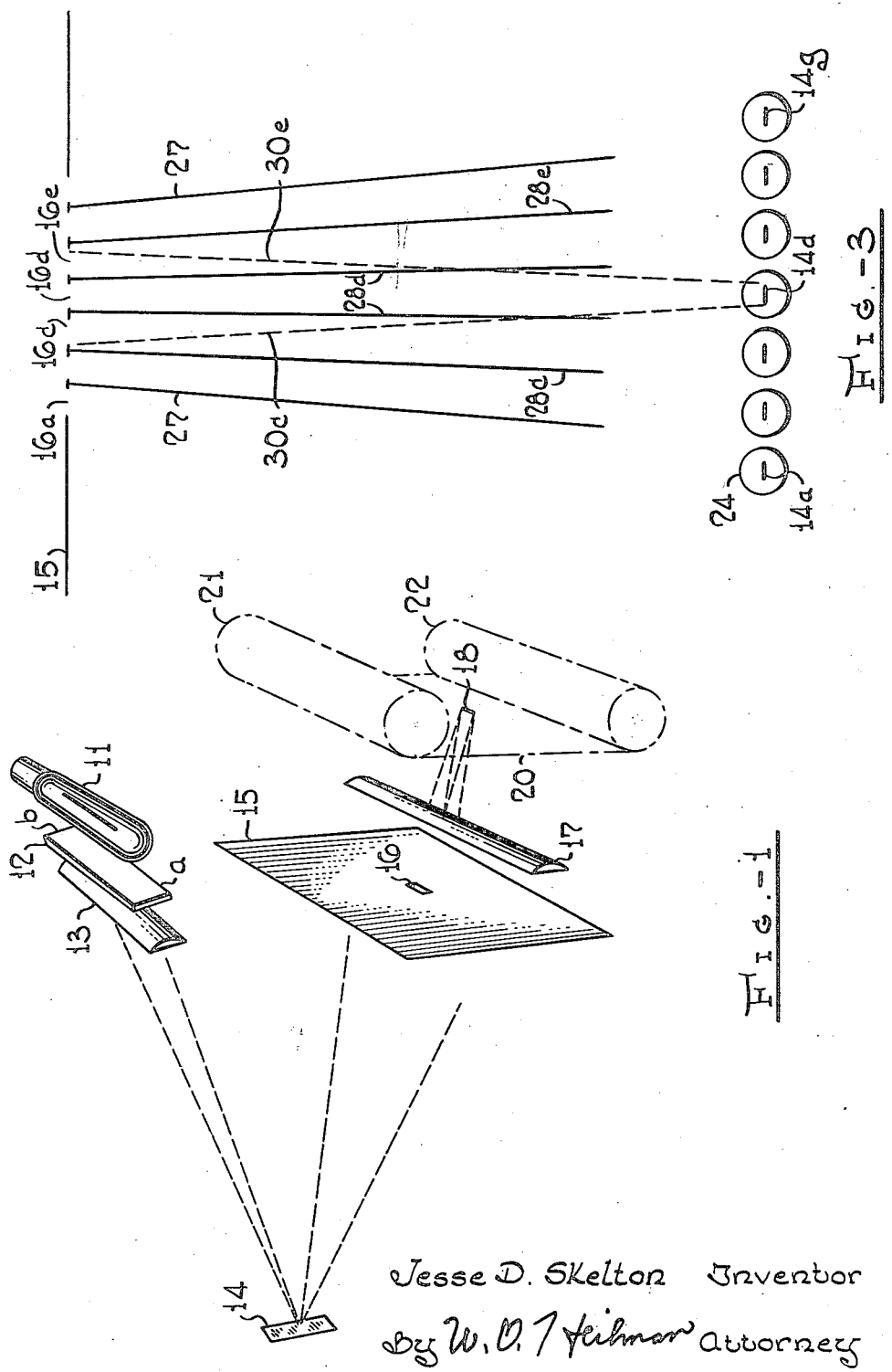
Figure 1 is a schematic diagram of an arrangement of light source, variable density filter, galvanometer, baffles and recording medium to carry out the method of the invention.

With particular reference to Figure 1, light from a line filament lamp 11 passes through a variable density filter 12 having linear variation in light transmission along its length, as from point $a$ to point $b$. The light beam passing through the filter is condensed by means of a cylindrical lens 13. The position of lens 13 and filter 12 may be interchanged if desired, and in fact it may be preferable to place the lens 13 between light 11 and filter 12 to insulate the latter from the heat of the lamp. This is particularly advantageous if filter 12 is in the form of photographic film. Also, lens 13 is not absolutely essential although it is practical to use it in order to get more efficient use of the light from lamp 11. A galvanometer mirror 14 reflects the beam toward a light barrier 15 in the center of which is provided an aperture 16. Galvanometer mirror 14 is of the type used in conventional seismograph recorders and rotates on its vertical axis in response to voltages fed to the galvanometer. A small portion of the image reflected by mirror 14 falls upon the aperture 16 and passes through the barrier, after which it is focused by cylindrical lens 17 into a line image 18 on the photographic medium 20. The latter may be carried by a pair of rollers 21 and 22 which feed the medium past the image focus point at a desired speed. Alternatively, the medium may be mounted on a drum much in the manner disclosed in the aforementioned Rieber patent.

Filter 12 may simply be a portion of photographic film that has been exposed to uniformly increasing amounts of light along its length and then developed in the usual manner. Such film will generally be satisfactory because it will ordinarily be subjected to the heat of the lamp for only a few seconds at a time. A more durable filter can be made however by coating a piece of glass with vaporized metal, the thickness of the coating increasing uniformly from one end to the other. In either case the filter is characterized by the fact that its light transmission properties decrease uniformly from one end to the other.

Aperture 16 may be rectangular in shape as shown in Fig. 1 or alternatively a trapezoidal shaped aperture 26 may be employed as shown in Figure 2. The advantage of the latter shape is that it will compensate for variation in light intensity across the aperture and thus make the line image have a uniform intensity. With either aperture the intensity of the light passing through the same is determined by the relative position of the aperture and the variable density image reflected by the galvanometer mirror. Since the reflected image position will be governed by the amount of rotation of the galvanometer mirror and since the rotation of mirror 14 will be proportional to the applied signal, it follows that when using a linear variable density filter 12 the intensity of light emerging from the aperture 16 or 26 will be proportional to the signal fed to the galvanometer. This is illustrated in Figure 2, showing various positions of the reflected image as it strikes shield 15, looking toward the shield from mirror 14. View A shows the position of aperture 26 with respect to the reflected image 19 when the galvanometer is receiving no signal and thus the mirror is not rotated; view B shows the relative position of the reflected image when the galvanometer mirror has rotated to its own right; and view C shows the relative position of the image and the aperture when the mirror has rotated to its own left. It will be seen that the light passing through the aperture when the mirror is in the position of view B will be more intense than when in the position of view A whereas when the mirror is in the position of view C the light will be less intense than in the position of view A.

The system is readily adaptable to multiple type channel recording, as illustrated in Figure 3. An arrangement of galvanometers 24 is provided much in the same manner as in conventional seismograph recording and a separate aperture 16a, etc. is provided in barrier 15 to correspond to each of the galvanometer mirrors 14a, etc. To prevent the reflected image from any of the mirrors from reaching an aperture other than its own aperture a plurality of light channel shields 27 are provided. The length of these channels must be sufficient to prevent the extreme edges of the beam from entering an adjacent channel. Thus the shields 27 defining channel 28d must be of sufficient length to prevent light from mirror 14d from reaching channels 28c and 28e within the area defined by dotted ray paths 30c and 30e, which lead to the extreme left edge of aperture 16c and the extreme right edge of aperture 16e. Shields 27 are constructed of black non-light-reflecting material so that any light from mirror 14d falling into channels 28c and 28e outside the defined area will not reach aperture 16c or 16e or any other aperture other than aperture 16d. Light source 11, filter 12 and lens 13 will not be in the same plane as the mirror and light channels but will be positioned either above them, as shown in Figure 1, or below them.

As a specific example of an operable multiple channel recorder, galvanometer mirrors 14 may be 0.03 inch wide and spaced 0.135 inch apart in a line 7¾ inches from the barrier 15. Apertures 16 will be 0.015 inch wide and spaced 0.058 inch apart, making the required length of light shields 27 approximately 5 inches.

It should be noted that although the preferred arrangement requires the use of cylindrical lens 17 to focus the light transmitted through the aperture into a line image, with light of sufficient intensity and with film of sufficient sensivity the height of aperture 16 could be the same as the width of the image 18, thus eliminating the need for lens 17. In this event film 20 would be placed close to the barrier 15. As a practical matter, however, lens 17 will usually be necessary for best results.

It is not intended that this invention be limited by the specific embodiments described, which have been presented by way of example only. Thus, although light source 11 is described as a line filament lamp any line light source, such as a fluorescent tube lamp could be employed instead, provided it furnishes illumination of sufficient intensity. The scope of the invention is defined in the following claims.

What is claimed is:

1. An apparatus for making a photographic record of an electrical transient which comprises in combination a line source of light; a reflecting mirror galvanometer with its mirror rotationally responsive to said transient; a light barrier provided with an aperture adapted to pass light through the barrier; said source, said reflecting mirror and said barrier being spaced from one another and arranged such that a substantially line-shaped image of the light source is reflected by the mirror to the barrier and such that rotational movements of the mirror cause different portions of the reflected image to pass through the aperture; a light filter having a progressively different light transmission along its length; said filter being positioned in the light path from the light source to the mirror and arranged such that the image on the barrier varies progressively in light intensity along its length; a photosensitive medium positioned adjacent said barrier such that light passing through the aperture in the barrier impinges upon said medium; and means for moving said medium relative to said aperture.

2. An apparatus as defined in claim 1 in which the aperture is of a trapezoidal shape with its wider side disposed toward the darker end of the image on the barrier.

3. An apparatus for making a photographic record of an electrical transient which comprises in combination: a reflecting mirror galvanometer whose mirror is rotationally responsive to said transient, means for directing an incident beam of light toward said mirror, said incident beam having a width measurement in a direction substantially normal to the axis of rotation of the mirror, a light barrier provided with a centrally disposed aperture for the passage of light through the barrier, the barrier being positioned relative to the mirror such that the beam of light reflected from the mirror impinges upon the barrier with a portion of the reflected beam passing through the aperture, filter means positioned in said incident beam to uniformly decrease the light intensity along the width of the incident beam, rotational movements of the mirror causing different portions along the width of the reflected beam to pass through the aperture in said barrier, a photographic medium adjacent said barrier and arranged such that light passing through the aperture impinges upon the medium, and means for moving said medium relative to the aperture in said barrier.

4. An apparatus for making a variable density photographic seismic record of an electrical transient generated by a geophone which comprises in combination: a line source of light; a reflecting mirror galvanometer rotationally responsive to said transient; a light barrier provided with a centrally disposed aperture; the light source, the galvanometer mirror and the barrier being spaced from one another and arranged such that light emitted by the light source is reflected by the mirror to form an elongated lighted area on the barrier including the aperture; the light source, the galvanometer and the barrier being arranged such that rotational motion of the mirror causes the lighted area on the barrier to move relative to the aperture; a variable density light filter positioned intermediate and spaced from said light source and said mirror; said filter having a progressively different light transmission characteristic along its length and being arranged such that the reflected area on the barrier increases progressively in light intensity along its length; a photo-sensitive medium positioned adjacent said light barrier such that the portion of reflected light passing through the aperture in the barrier impinges upon the medium; and means for moving said medium relative to said aperture.

5. An apparatus for making a photographic record of a plurality of electrical transients which comprises in combination a line source of light; an array of reflecting mirror galvanometers with the mirror of each galvanometer being rotationally responsive to a separate transient; a light barrier provided with an array of apertures; each aperture being adapted to pass light through the barrier; said source, said array of galvanometers and said barrier being spaced from one another and arranged such that a substantially line-shaped image of the light source is reflected by each separate galvanometer mirror through a separate aperture and such that rotational movements of each mirror cause different portions of the image reflected by that mirror to pass through its respective aperture; a light filter having a progressively different light transmission along its length; said filter being positioned in the light path from the light source to the array of galvanometer mirrors and arranged such that each image reflected to the barrier by the array of galvanometer mirrors varies progressively in light intensity along its length; a photosensitive medium positioned adjacent said barrier such that light from the mirrors passing through the apertures in the barrier impinges upon said medium; and means for moving said medium relative to said apertures.

6. An apparatus for making a photographic record of a plurality of electrical transients which comprises in combination an array of reflecting mirror galvanometers with the mirror of each galvanometer being rotationally responsive to a separate transient; means for directing an incident beam of light toward said array of mirrors; said incident beam having a width measurement in a direction substantially normal to the axes of rotation of the mirrors; the axes of rotation of the mirrors being substantially parallel to one another; a light barrier provided with a centrally disposed array of apertures for the passage of light through the barrier; the barrier being positioned relative to the array of mirrors such that the beam of light reflected from each mirror impinges upon the barrier; a plurality of light shields positioned between said barrier and said galvanometer mirrors and adapted to channel the reflected light beam from each galvanometer mirror to a separate aperture; filter means positioned in said incident beam to decrease uniformly the light intensity along the width of the incident beam; rotational movements of each mirror causing different portions along the width of each reflected beam to pass through its corresponding aperture in said barrier; a photographic medium adjacent said barrier and arranged such that light passing through each aperture impinges upon the medium; and means for moving said medium relative to the apertures in said barrier.

References Cited in the file of this patent

UNITED STATES PATENTS

| | | |
|---|---|---|
| 1,880,942 | Erickson | Oct. 4, 1932 |
| 2,277,421 | Suits et al. | Mar. 24, 1942 |
| 2,323,606 | Kellogg | July 6, 1943 |
| 2,499,593 | Kreuzer et al. | Mar. 7, 1950 |
| 2,587,219 | Rettinger | Feb. 26, 1952 |